US008472890B2

(12) United States Patent
Zhuo et al.

(10) Patent No.: US 8,472,890 B2
(45) Date of Patent: Jun. 25, 2013

(54) ADJUSTABLE LOCAL OSCILLATOR PATH IN A COMMUNICATION DEVICE WITH A TRANSMITTER

(75) Inventors: Wei Zhuo, San Diego, CA (US); Aristotele Hadjichristos, Cary, NC (US); Tzu-wang Pan, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1217 days.

(21) Appl. No.: 11/947,597

(22) Filed: Nov. 29, 2007

(65) Prior Publication Data

US 2009/0130994 A1 May 21, 2009

Related U.S. Application Data

(60) Provisional application No. 60/989,203, filed on Nov. 20, 2007.

(51) Int. Cl.
*H04B 1/40* (2006.01)
(52) U.S. Cl.
USPC ............... 455/86; 455/85; 455/69; 455/115.3
(58) Field of Classification Search
USPC ........... 455/127.1, 125, 3, 43.1, 67.13, 67.11, 455/68, 69, 73, 130, 84–86, 88, 91, 115, 455/115.3, 115.4, 126, 226.1, 226.2, 226.3, 455/226.4, 230, 334, 340–341; 327/544–546; 330/129
See application file for complete search history.

(56) References Cited

U.S. PATENT DOCUMENTS

| 5,815,821 | A | 9/1998 | Pettersson |
| 6,298,221 | B1 | 10/2001 | Nguyen |
| 6,965,655 | B1 | 11/2005 | Mostov et al. |
| 7,248,653 | B2 * | 7/2007 | Wieck ............................ 375/345 |
| 7,283,851 | B2 * | 10/2007 | Persico et al. ................. 455/574 |

(Continued)

FOREIGN PATENT DOCUMENTS

| CN | 1501588 A | 6/2004 |
| EP | 0366485 A2 | 5/1990 |

(Continued)

OTHER PUBLICATIONS

International Search Report and Written Opinion—PCT/US2008/083944—ISA/EPO—Apr. 16, 2009.
Taiwan Search Report—TW097144974—TIPO—Nov. 16, 2011.

*Primary Examiner* — Pablo Tran
(74) *Attorney, Agent, or Firm* — Kenyon S. Jenckes (57) ABSTRACT

A communication device includes a transmitter and a receiver. The receiver mixes a local oscillator (LO) signal with the received signal to downconvert the received signal to an intermediate frequency (IF). The LO path that feeds the LO signal to the downconverting mixer is controlled based on the transmit power of the transmitter. For high transmit power, the drive of the LO path is increased, thereby increasing the signal-to-noise ratio of the LO signal input into the mixer. For low transmit power levels, the drive to the LO path is decreased, reducing power consumption in the communication device. In this way, receiver path noise due to mixing of the LO phase noise with the self-generated transmitter signal is selectively controlled while incurring lower power consumption penalty. The communication device may be an access terminal configured for communication with a cellular radio network.

23 Claims, 3 Drawing Sheets

U.S. PATENT DOCUMENTS

| | | | |
|---|---|---|---|
| 7,299,021 B2 * | 11/2007 | P rssinen et al. | 455/226.1 |
| 7,684,775 B2 * | 3/2010 | Vepsalainen et al. | 455/266 |
| 7,787,850 B2 * | 8/2010 | Rofougaran | 455/245.1 |
| 7,937,120 B2 * | 5/2011 | Blin | 455/574 |

FOREIGN PATENT DOCUMENTS

| | | |
|---|---|---|
| JP | 2003283361 A | 10/2003 |
| JP | 2006345116 A | 12/2006 |
| WO | WO2005099109 A1 | 10/2005 |

* cited by examiner

ADJUSTABLE LOCAL OSCILLATOR PATH IN A COMMUNICATION DEVICE WITH A TRANSMITTER

PRIORITY

This application claims benefit of U.S. Provisional Application No. 60/989,203 titled "ADJUSTABLE LOCAL OSCILLATOR PATH IN A COMMUNICATION DEVICE WITH A TRANSMITTER," filed Nov. 20, 2007, the entire disclosure of this application being considered part of the disclosure of this application.

BACKGROUND

1. Field

The present invention relates generally to radio frequency processing systems, methods, and articles of manufacture. More particularly, the invention relates to downconverting a received signal to an intermediate or baseband frequency. The systems, methods, and articles of manufacture may be employed in telecommunications, including uses in cellular access terminals.

2. Background

A modern communication system is expected to provide reliable data transmission for a variety of applications, such as voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents known as the "W-CDMA standard," (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard, and (6) certain other standards. The standards expressly listed above are incorporated by reference as if fully set forth herein, including annexes, appendices, and other attachments.

Receivers of access terminals generally include mixers for converting the received radio frequency signals to a baseband or a lower intermediate frequency (IF), for subsequent processing at that frequency.

In full duplex systems such as CDMA and W-CDMA systems operating in accordance with the standards mentioned above, a receiver of an access terminal is subject to interference from the terminal's own transmitter, whose transmit signal leaks through a duplexor to an input of a low noise amplifier (LNA) at the receiver's front end. The transmitter's leakage may be modulated with an external jammer signal (any other interfering signal), causing cross-modulation products to degrade the receiver's sensitivity. In a zero-IF receiver, for example, the transmitter signal leakage may also produce second harmonic products, falling within the baseband at mixer output, thereby contaminating the desired signal in the receive path.

To deal with the transmitter signal leakage, the LNA may be designed to meet stringent cross modulation (linearity) requirements. This typically necessitates large current consumption in the LNA. Also, an inter-stage surface acoustic wave (SAW) filter may be interposed between the LNA and the mixer input to attenuate the transmitter leakage ahead of the mixer, thereby reducing the stringency of the requirements applicable to the local oscillator path and to components following the down-converting mixer. Inclusion of a SAW filter in an access terminal, however, may increase cost and size of the terminal.

A number of sometimes competing criteria affects the design of communication devices, such as cellular access terminal receivers and GPS receivers. The criteria includes size, weight, power consumption, and noise figure. Therefore, there is a need in the art for radio frequency receivers with improved noise figures. There is also a need in the art for radio frequency receivers with reduced size and reduced weight. There is a further need in the art for receivers with reduced power consumption.

SUMMARY

Embodiments disclosed herein may address one or more of the above stated needs by providing apparatus, methods, and articles of manufacture for mixing and converting (translating) radio frequency signals to a different frequency, for example, to an intermediate frequency of a receiver. Drive level of a local oscillator path in a receiver is varied in response to transmit power of a transmitter.

In an embodiment, a method of operating a communication device includes operating a transmitter of the communication device to send a transmit signal. The method also includes generating a local oscillator signal in a local oscillator of a receiver of the communication device. The method further includes processing the local oscillator signal in a local oscillator path of the receiver to obtain a processed oscillator signal. The method further includes varying power consumption and phase noise of the local oscillator path in response to power of the transmit signal. The step of varying may be performed while the receiver is operational.

In an embodiment, a method of operating a communication device includes sending a transmit signal. The method also includes generating a local oscillator signal. The method further includes processing the local oscillator signal in a local oscillator path to obtain a processed oscillator signal. The method further includes setting a drive level of the local oscillator path to a first setting in response to the power of the transmit signal being above a first predetermined transmit power level. The method further includes setting the drive level of the local oscillator path to a second setting in response to the power of the transmit signal not being above the first predetermined transmit power level.

In an embodiment, a communication device includes a transmitter, a receiver, and a controller. The controller is coupled to the transmitter to control operations of the transmitter, and to the receiver to control operations of the receiver. The transmitter is configured to send a transmit signal. The receiver includes a mixer, a local oscillator configured to generate a local oscillator signal, and a local oscillator path connected between the local oscillator and the mixer. The local oscillator path is configured to process the local oscillator signal to obtain a processed local oscillator signal. The local oscillator path is further configured to couple the processed local oscillator signal to the mixer. The receiver is configured to receive a receive signal and convert the receive signal to an intermediate frequency using the mixer. The local oscillator path is configured to receive different levels of at least one supply voltage, and the signal-to-noise ratio of the processed local oscillator signal varies depending on the at least one supply voltage. The controller is configured to increase the at least one supply voltage in response to an increase in power of the transmit signal, and to decrease the at least one supply voltage in response to a decrease in the power of the transmit signal.

In an embodiment, an access terminal includes a means for sending a transmit signal. The access terminal also includes a means for receiving a receive signal. The means for receiving includes a means for mixing, a means for generating a local oscillator signal, and a means for connecting the means for generating to the means for mixing. The means for connecting is configured to process the local oscillator signal to obtain a processed local oscillator signal. The means for receiving is configured to convert the receive signal to an intermediate frequency using the means for mixing. The means for connecting is configured to receive different levels of at least one supply voltage, wherein signal-to-noise ratio of the processed local oscillator signal varies depending on the at least one supply voltage. The access terminal further includes a means for varying the at least one supply voltage in response to power of the transmit signal during full duplex operation of the access terminal.

In an embodiment, a machine-readable medium stores instructions. When the instructions are executed by at least one processor of a wireless communication device, the instructions cause the wireless communication device to perform a number of steps. The wireless communication device includes the at least one processor, a receiver, and a transmitter. The receiver includes a mixer, a local oscillator configured to generate a local oscillator signal, and a local oscillator path connected between the local oscillator and the mixer. The local oscillator path is configured to process the local oscillator signal to obtain a processed local oscillator signal, and to couple the processed local oscillator signal to the mixer. The receiver is configured to receive a receive signal and convert the receive signal to a different frequency using the mixer. The local oscillator path is configured to receive different levels of at least one supply voltage, and signal-to-noise ratio of the processed local oscillator signal varies depending on the at least one supply voltage. The plurality of steps includes determining power level of the transmit signal, and varying at least one supply voltage of the local oscillator path in response to the power of the transmit signal. The step of varying may be performed while the receiver is operational.

In an embodiment, a method of operating a communication device includes sending a transmit signal, and generating a local oscillator signal. The method also includes processing the local oscillator signal in a local oscillator path to obtain a processed oscillator signal, and varying power consumption of the local oscillator path in response to power of the transmit signal.

In an embodiment, a method of operating a communication device includes sending a transmit signal, and generating a local oscillator signal. The method also includes processing the local oscillator signal in a local oscillator path to obtain a processed oscillator signal. The method further includes determining the power level of the transmit signal, and varying at least one supply voltage of the local oscillator path in response to the power level of the transmit signal. The step of varying may be performed while a receiver of the communication device is operational.

These and other embodiments and aspects of the present invention will be better understood with reference to the following description, drawings, and appended claims.

DETAILED DESCRIPTION

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place may refer to a different apparatus, process, or article of manufacture. The expression "alternative embodiment" and similar phrases may be used to indicate one of a number of different possible embodiments. The number of possible embodiments is not necessarily limited to two or any other quantity.

A "transconductance amplifier" or "transconductance stage" is an amplifier, buffer, or a similar device in which an input voltage produces an output current; essentially, it is a voltage-controlled current source designed to provide substantially current-source (high impedance) output or outputs.

An "intermediate frequency" or "IF" includes zero IF.

Expressions "local oscillator path" and "LO path" refer to components connecting the output of a local oscillator to an input of a mixer used for converting a received signal to an IF.

"Power level" and "transmit power level" include a zero power level at which no energy is being transmitted; a transmitter transmitting at zero power level may be turned off.

"Drive level" refers to a level of supply or biasing voltage or current; as will be seen from the description, a drive level of a local oscillator path changes both the power consumption of the path and the signal-to-noise ratio of the signal at the output of the path.

An access terminal, which also may be referred to as AT, subscriber station, user equipment, UE, mobile terminal, MT, or cellular communication device may be mobile or stationary, and may communicate with one or more base transceiver stations. An access terminal may be any of a number of types of devices, including but not limited to personal computer (PC) card, external or internal modem, wireless telephone, and personal digital assistant (PDA) with wireless communication capability. An access terminal transmits and receives data packets to or from a radio network controller through one or more base transceiver stations.

Base transceiver stations and base station controllers are parts of a network called radio network, RN, access network, or AN. A radio network may be a UTRAN or UMTS Terrestrial Radio Access Network. The radio network may transport data packets between multiple access terminals. The radio network may be further connected to additional networks outside the radio network, such as a corporate intranet, the Internet, a conventional public switched telephone network (PSTN), or another radio network, and may transport data and voice packets between each access terminal and such outside networks. Depending on conventions and on the specific implementations, a base transceiver station may be referred to by other names, including Node-B, base station system (BSS), and simply base station. Similarly, a base station controller may be referred to by other names, including radio network controller, RNC, controller, mobile switching center, or serving GPRS support node.

The scope of the invention extends to these and similar wireless communication system components, as well as to other electronic equipment.

The word "exemplary" may be used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the invention.

As noted above, a low noise amplifier of an access terminal or of another communication device may need to be designed to meet rather stringent linearity requirements. Such enhanced linearity requirements may increase the cost, size, and current consumption of the LNA. As was also noted above, a surface acoustic wave filter may be included between the LNA and the mixer input to attenuate the transmitter leakage into the mixer. The SAW filter, however, similarly tends to increase the cost and size of the access terminal.

Thus, it may be preferable to remove the SAW filter between the LNA and the mixer, to improve integration and reduce the cost. At the same time, it may be preferable not to tighten (or perhaps even to loosen) the linearity requirements imposed on the LNA. As a result, very stringent phase noise requirements may have to be imposed on the local oscillator (LO) signal at the transmit frequency of the access terminal; such phase noise requirements may and typically do significantly increase the current consumption of the LO path, and consequently shorten the battery life of the access terminal.

The phase noise performance requirements are most stringent when the transmitter of the access terminal is operating at maximum power. Also, a typical cellular access terminal operates at the maximum transmitter power for only a small percentage of the time.

Figure 1:
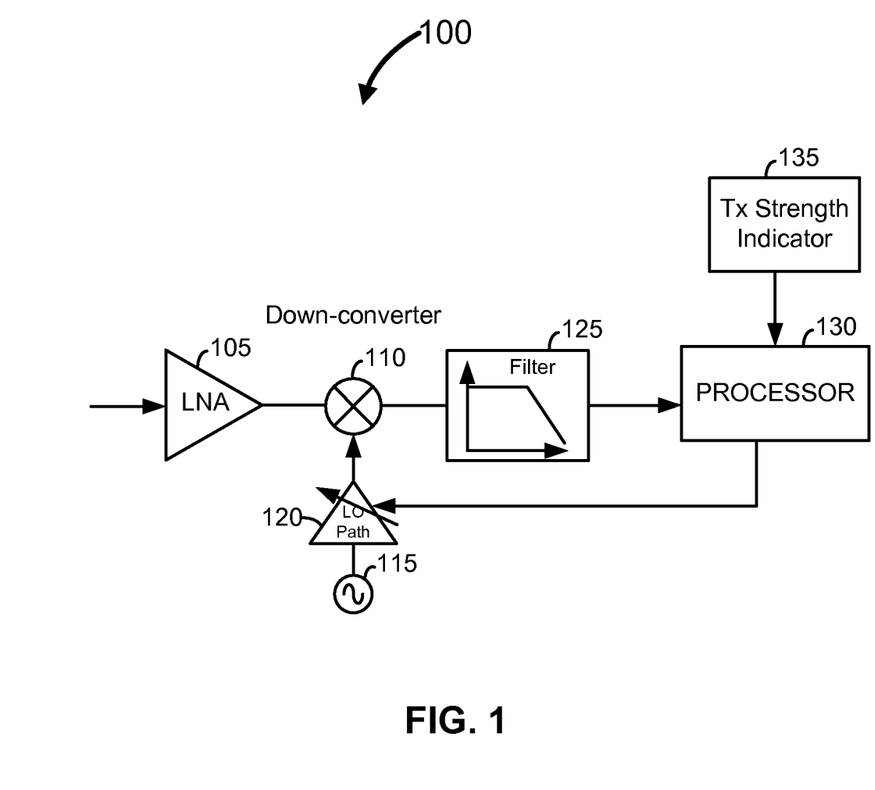
FIG. 1 illustrates selected components and blocks of a receiver in which local oscillator path power consumption and phase noise performance are adjusted in response to variations in transmitter power.

FIG. 1 illustrates selected components and blocks of an access terminal receiver path 100 in which the LO phase noise performance is dynamically adjusted in response to variations in the transmitter power of the access terminal. In this way, the average current consumed by the access terminal may be decreased without unnecessarily imposing strict linearity requirements on the LNA of the access terminal's receiver.

The receiver path 100 includes a low noise amplifier 105, an intermediate frequency mixer 110, a local oscillator 115, a local oscillator path 120, a filter 125, a processor 130, and a transmit signal strength indicator block 135. The receiver path 100 may be used without a SAW filter interposed between the LNA 105 and the input to the mixer 110.

As shown in FIG. 1, the frequency to which the signal received at the input to the LNA 105 is downconverted is zero. This is not necessarily a requirement; conversion to non-zero intermediate frequency also falls within the scope of this disclosure. In non-zero-IF variants, the filter 125 may correspondingly be centered at or about the actual intermediate frequency of the receiver.

The processor 130 may be, for example, a digital signal processor (DSP), a microprocessor, or a combination of several processors, as described in more detail below.

The Tx (transmit) strength indicator block 135 may be, for example, a hardware component such as one or more memory locations readable by the processor 130, or an input to the processor 130 that provides a signal indicating the transmit strength of the transmitter of the access terminal of which the receiver path 100 is a part. The Tx strength indicator block 135 may provide the transmit strength in real time. The block 135 may also provide an indication of a changing state of the transmit power. For example, the block 135 may provide an indication of the transmitter being powered up. In some variants, the block 135 provides both an indication of the current transmit power and an indication of a pending change in the transmit power. In some variants, the block 135 provides (1) a real time indication of the state of the transmitter, and (2) when the transmitter is turned on, an indication of the current transmit power of the transmitter. In some variants, however, the block 135 provides the real time indication of the state of the transmitter, without the indication of the transmit power; similarly, in some variants, the block 135 provides the indication of the transmit power, without the indication of the transmitter state. (Transmitter state may sometimes be inferred from the transmit power; for example, zero transmit power may imply that the transmitter is off.)

It should be noted that, in some embodiments, the indication of the transmitter state is provided by a Tx Power Wake-Up signal, which is a signal directing the transmitter of an access terminal to wake-up for communication with a base station of a radio network. The Tx Power Wake-Up signal turns on the transmitter of the access terminal when a voice and/or data call is being set up between the access terminal and the radio network. It should be further noted that, in some embodiments, the indication of transmit power is provided by a Tx AGC signal.

The LO 115 is the local oscillator of the receiver. This may be a free-running crystal oscillator, a voltage controlled crystal oscillator directly locked to another signal, or an oscillator of a programmable or not programmable synthesizer.

The output of the LO 115 passes through the LO path 120. The LO path 120 may include one or more transconductance stages, one or more buffers, and/or one or more frequency dividers, as well as other devices. The LO path 120 or its various components may form a part of the synthesizer mentioned in the preceding paragraph.

In operation, the processor 130 receives from the block 135 information regarding the transmit power of the access terminal. In response to the transmit power information, the processor 130 determines the appropriate phase noise of the LO signal at the LO input to the mixer 110, and the corresponding drive level(s) of one or more components of the LO path 120. In some variants, the drive level(s) of the LO path 120 is (are) determined by the supply voltage provided to one, several, or all the components of the LO path 120. The drive level(s) may be adjusted in a single step or in a number of steps. There may be, for example, two, three, four, or any plurality of discrete settings for each controllable supply voltage of the LO path 120.

In a simple case, for example, a first drive level may be provided when the transmitter is off, and a second (higher) drive level may be provided when the transmitter is turned on. The drive level may be adjusted a predetermined time period before the transmitter is turned on, or a predetermined time period before the transmit power level is increased. Similarly, the drive level may be adjusted a predetermined time period after the transmitter is turned off, or a predetermined time period after the transmit power level is decreased.

In a more involved example, there may be more than two different drive levels used for adjusting the performance of the LO path 120. In some variants, there may be the same or substantially the same number of drive levels as there are possible transmit power levels of the transmitter.

If a ramp profile is used for turning the transmitter on or changing the transmit power, the processor 130 may adjust the drive level of the LO path 120 in lockstep with the adjustment of the transmit power level. The drive level of the LO path 120 may be stepped up a predetermined time period before the transmitter power is stepped up on the profile ramp, and the drive level may be stepped down the same or a different predetermined time period after the transmit power is stepped down on the profile ramp. In this way, the phase noise of the LO is improved ahead of the advances in the transmit power, and diminished after the decreases in the transmit power.

In some variants, the processor 130 varies the drive level of the LO path 120 roughly to maintain a constant signal to noise ratio for a given receive signal strength at the receiver.

In some variants, the processor 130 varies the drive level of the LO path 120 as a predefined function of the transmit power level. The function may be a linear relationship. Different predefined functions may be used for different states of the battery charge of the access terminal. For example, the processor 130 may attempt to control the phase noise of the LO path 120 in a more aggressive manner (corresponding to a higher drive level) when the battery state is above a predetermined charge indication, as compared to a less aggressive control (corresponding to a lower drive level) when the battery state is below the predetermined charge indication. Similarly, the processor 130 may attempt to control the phase noise of the LO path 120 in a more aggressive manner when the access terminal receives power from a charger device, as compared to a less aggressive control when the access terminal is powered by a battery.

Figure 2:
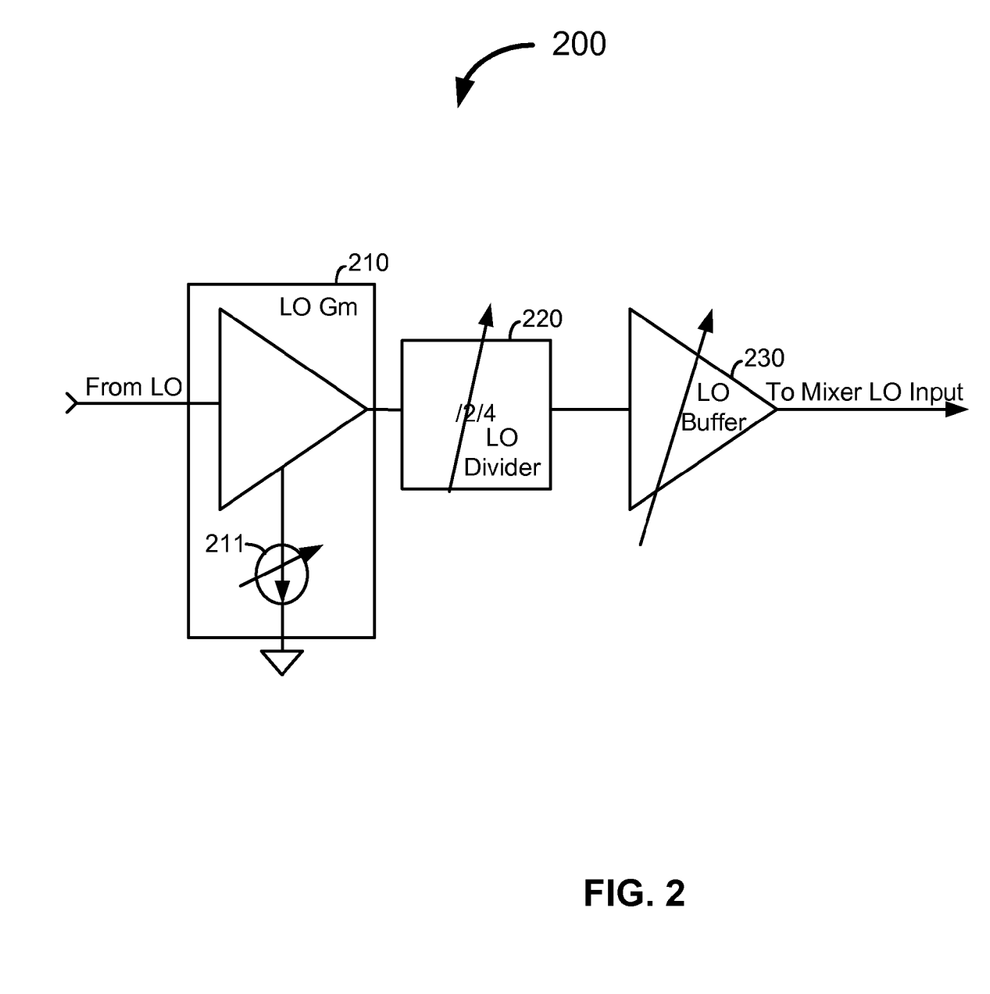
FIG. 2 illustrates selected components and blocks of an adjustable local oscillator path that can be used in the receiver shown in FIG. 1.

FIG. 2 illustrates selected components and blocks of an LO path 200, which may be similar or identical to the LO path 120 shown in FIG. 1. The LO path 200 includes a local oscillator Gm stage 210, a local oscillator frequency divider 220, and a local oscillator buffer 230. The LO Gm stage 210 is a transconductance amplifier or buffer, providing an output current as a function of its input voltage, and isolating the local oscillator 115 from the divider 220. The LO Gm stage 210 includes a biasing current source 211, which is controlled by the processor of the receiver to which the LO path 200 belongs, such as the processor 130 shown in FIG. 1. The input to the current source 211 may be a supply voltage controlled by the processor. Generally, for efficient designs, the higher the supply voltage controlling the current source 211, the lower the relative phase noise at the output of the LO path 200. (Relative LO phase noise is the LO phase noise at a given offset relative to the LO signal strength; an increase in the supply voltage will typically raise both the noise floor and the signal, but the signal will typically rise faster than the noise floor.)

The input of the LO Gm stage 210 is coupled to the output of the local oscillator 115, such as the output of the LO 115. The output of the LO Gm stage 210 is coupled to the input of the frequency divider 220.

The divided LO frequency signal at the output of the frequency divider 220 is coupled to the buffer 230. The output of the buffer 230 is coupled to the LO input port of a mixer configured to convert a receive signal (e.g., access terminal receive signal) down to an intermediate frequency, such as the mixer 110 shown in FIG. 1. The buffer 230 isolates the mixer from the divider 220, and may also provide some LO signal amplification.

The supply voltages to the frequency divider 220 and the buffer 230 are controlled by the processor. Again, for efficient designs, the higher the supply voltages to the divider 220 and the buffer 230, the lower the relative phase noise at the output of the LO path 200. The processor may be configured to control the supply voltages to the divider 220, the buffer 230, and the current source 211 of the LO Gm stage 210 using a single control signal. Alternatively, the processor may control each of these supply voltages or any combinations of these supply voltages separately. Moreover, only some of these supply voltages may in fact be controlled, while the remaining supply voltage or voltages may be held constant.

Generally, the current consumption of the LO path 200 (and consequently of the access terminal) increases with the increasing supply voltages provided to the current source 211, the divider 220, and the buffer 230. At the same time, the signal-to-noise ratio of the local oscillator signal at the output of the LO path 200 increases with the increasing supply voltages. For CMOS logic implementations, the power consumed in a circuit increases linearly with operating frequency and with loading capacitance of the logic family, and as a second power of the supply voltage: $P \propto C \cdot V^2 \cdot f$.

Table 1 below summarizes results (phase noise versus different supply voltages) for a local oscillator-LO path combination of a particular embodiment operating at a particular frequency. In the table, the left-most column shows different current setting codes; the second column from the left shows the supply voltages corresponding to the current setting codes; the second column from the right shows the relative phase noise floor at the transmit frequency offset; and finally the right-most column shows the corresponding current drains for the particular embodiment tested.

TABLE 1

| Current setting Code | Supply Voltage for CMOS buffer | PN @ Tx frequency | Current Consumption |
| --- | --- | --- | --- |
| 11 | 1.6 | −158 dBc/Hz | 17.5 mA |
| 00 | 1.4 | −148 dBc/Hz | 12.4 mA |

The receiver path 100 of FIG. 1 and other receiver path embodiments and variants described may be used in the main receiver of an access terminal, i.e., in the receiver designed to communicate with the radio network. Additionally, the receiver path 100 and other embodiments/variants described may be used in the receiver of the global positioning system (GPS) block that may be included in the access terminal. Indeed, the receiver path 100 and other embodiments and variants may be used in other communication devices that include transmitters and receivers.

Figure 3:
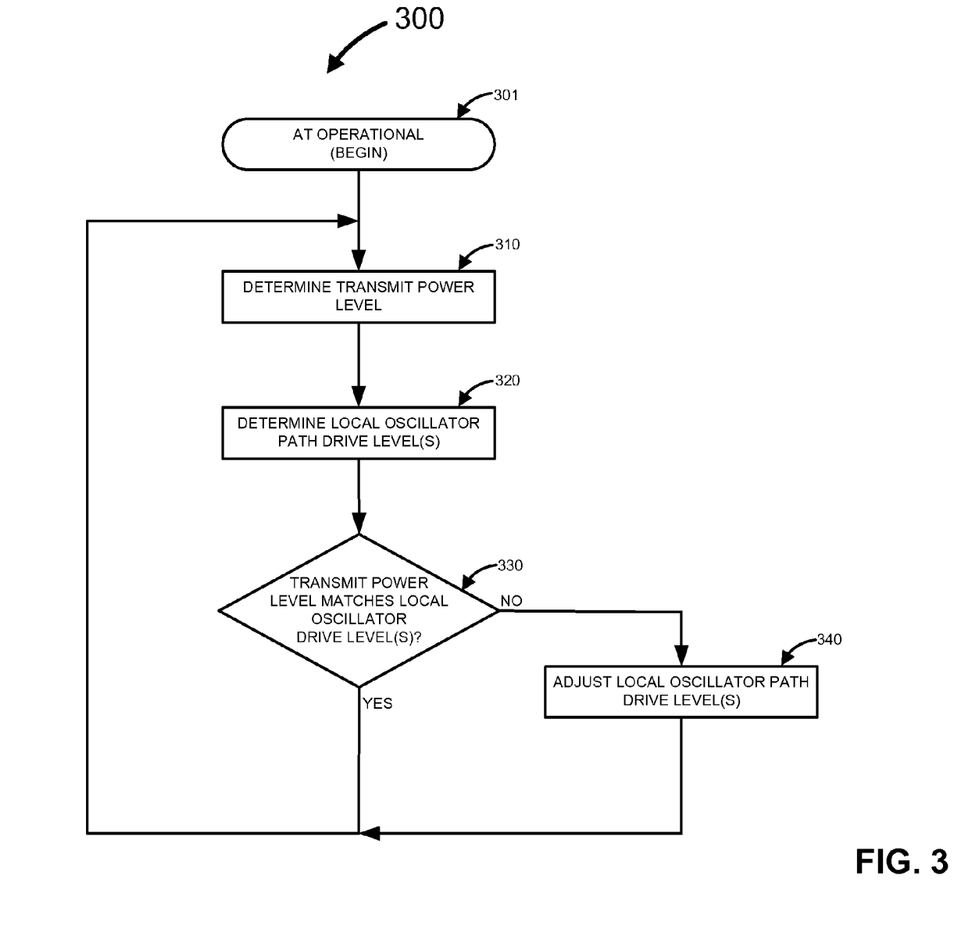
FIG. 3 shows selected steps and decision blocks of a process of adjusting a local oscillator path in response to variations in transmitter power.

FIG. 3 shows selected steps and decision blocks of a process 300 that may be performed by the processor 130 in the course of controlling the LO path 120 or 200. Beginning with a flow point 301, the access terminal of which the receiver path 100 is a part has been configured and is operational.

In step 310, the processor 130 determines the present and/or anticipated transmit power level of the transmitter of the access terminal. This step may include, for example, reading the Tx Power Wake-Up signal and/or the Tx AGC signal.

In step 320, the processor 130 determines the drive level or levels of the LO path 120. (Recall that either a single level or multiple levels may be controlled, either separately or together.) The step 320 may include, for example, reading one or more registers or memory locations that store the programmed supply voltage(s) for the component(s) of the LO path 120.

In decision block 330, the processor determines whether the transmit power corresponds to the drive level or levels of the LO path 120. The relationship(s) between the drive level(s) and the transmit power may be stored as an array or arrays in the memory of the processor 130, or in another memory of the access terminal. If the transmit power corresponds to the drive level or levels, process flow may loop back to the step 310. Otherwise, process flow branches to step 340, in which the drive level or levels are adjusted in the appropriate direction. For example, if the transmit power is too high for the drive level(s), the drive level(s) may be increased; if the transmit power is too low for the drive level(s), the drive level(s) may be decreased. After the adjustment made in the step 340, process flow may loop back to the step 310. Additional adjustment, if needed, may take place during the next process iteration. Alternatively, the step 340 may effect the entire adjustment in drive levels at once, or it may effect the adjustment gradually but delay looping back until the entire adjustment is effected.

In some embodiments and variants, steps for controlling transmit power of an access terminal are stored in firmware, while the steps for controlling the drive level(s) of the LO path are stored in software. These storage selections, however, are not necessarily required in all embodiments and variants.

Although steps and decisions of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the particular sequences described above and/or shown in the accompanying Figures. Furthermore, not every illustrated step and decision may be required in every embodiment/variant in accordance with the invention, while some steps and decisions that have not been specifically illustrated may be desirable or necessary in some embodiments/variants in accordance with the invention.

Those skilled in the art would understand that different CMOS devices may be used in the LO path and elsewhere, and that other, non-CMOS devices may be used as well.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps may have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm that may have been described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method of operating a communication device, the method comprising:
    operating a transmitter of the communication device to send a transmit signal;
    generating a local oscillator signal in a local oscillator of a receiver of the communication device;
    processing the local oscillator signal in a local oscillator path coupled to the local oscillator of the receiver to obtain a processed oscillator signal; and
    varying power consumption and phase noise of the local oscillator path in response to variations in two or more non-zero transmit power levels of the transmit signal, wherein the two or more non-zero transmit power levels are obtained by the communication device.

2. The method of claim 1, wherein the step of varying comprises:

raising the power consumption and improving the phase noise of the local oscillator path in response to an increase of the power of the transmit signal; and lowering the power consumption and degrading the phase noise of the local oscillator path in response to a decrease of the power of the transmit signal.

3. The method of claim 2, further comprising:
receiving a receive signal with the receiver;
amplifying the receive signal in the communication device to obtain an amplified receive signal; and
mixing the amplified receive signal with the processed local oscillator signal within the communication device.

4. A method of operating a communication device, the method comprising:
sending a transmit signal from the communication device;
generating a local oscillator signal with a local oscillator of the communication device;
processing the local oscillator signal in a local oscillator path coupled to the local oscillator of the communication device to obtain a processed oscillator signal; and
varying, by the communication device, power consumption of the local oscillator path in response to variations in two or more non-zero transmit power levels of the transmit signal, wherein the two or more non-zero transmit power levels are obtained by the communication device.

5. The method of claim 4, wherein the step of varying comprises:
raising the power consumption of the local oscillator path in response to an increase of the power of the transmit signal; and
lowering the power consumption of the local oscillator path in response to a decrease of the power of the transmit signal.

6. The method of claim 5, wherein the step of raising is performed so that relative phase noise of the processed local oscillator signal is decreased, and the step of lowering is performed so that the relative phase noise of the processed local oscillator signal is increased.

7. The method of claim 4, wherein the step of varying comprises:
raising a drive level provided to the local oscillator path by the communication device in response to an increase of the power of the transmit signal; and
lowering the drive level of the local oscillator path by the communication device in response to a decrease of the power of the transmit signal.

8. The method of claim 7, wherein the step of raising is performed so that relative phase noise of the processed local oscillator signal is decreased, and the step of lowering is performed so that the relative phase noise of the processed local oscillator signal is increased.

9. An apparatus, comprising:
means for sending a transmit signal;
means for generating a local oscillator signal;
means for processing the local oscillator signal in a local oscillator path to obtain a processed oscillator signal; and
means for varying power consumption of the local oscillator path in response to variations in two or more non-zero transmit power levels of the transmit signal, wherein the two or more non-zero transmit power levels are obtained by the communication device.

10. The apparatus of claim 9, wherein the means for varying comprises:

means for raising the power consumption of the local oscillator path in response to an increase of the power of the transmit signal; and
means for lowering the power consumption of the local oscillator path in response to a decrease of the power of the transmit signal.

11. The apparatus of claim 10, wherein the means for raising decreases relative phase noise of the processed local oscillator signal, and the means for lowering increases the relative phase noise of the processed local oscillator signal.

12. The apparatus of claim 9, wherein the means for varying comprises:
means for raising a drive level provided to the local oscillator path in response to an increase of the power of the transmit signal; and
means for lowering the drive level of the local oscillator path in response to a decrease of the power of the transmit signal.

13. The apparatus of claim 12, wherein the means for raising decreases relative phase noise of the processed local oscillator signal, and the means for lowering increases the relative phase noise of the processed local oscillator signal.

14. A computer program product, comprising:
a non-transitory computer-readable medium, comprising:
code for sending a transmit signal;
code for generating a local oscillator signal with a local oscillator;
code for processing the local oscillator signal in a local oscillator path coupled to the local oscillator to obtain a processed oscillator signal; and
code for varying power consumption of the local oscillator path in response to variations in two or more non-zero transmit power levels of the transmit signal, wherein the two or more non-zero transmit power levels are obtained by the communication device.

15. The computer program product of claim 14, wherein the code for varying comprises:
code for raising the power consumption of the local oscillator path in response to an increase of the power of the transmit signal; and
code for lowering the power consumption of the local oscillator path in response to a decrease of the power of the transmit signal.

16. The computer program product of claim 15, wherein the code for raising decreases relative phase noise of the processed local oscillator signal, and the code for lowering increases the relative phase noise of the processed local oscillator signal.

17. The computer program product of claim 14, wherein the code for varying comprises:
code for raising a drive level provided to the local oscillator path in response to an increase of the power of the transmit signal; and
code for lowering the drive level of the local oscillator path in response to a decrease of the power of the transmit signal.

18. The computer program product of claim 17, wherein the code for raising decreases relative phase noise of the processed local oscillator signal, and the code for lowering increases the relative phase noise of the processed local oscillator signal.

19. A communication device, comprising:
at least one processor configured to:
send a transmit signal;
generate a local oscillator signal at a local oscillator of the communication device;

process the local oscillator signal in a local oscillator path coupled to the local oscillator to obtain a processed oscillator signal; and vary power consumption of the local oscillator path in response to variations in two or more non-zero transmit power levels of the transmit signal, wherein the two or more non-zero transmit power levels are obtained by the communication device.

20. The communication device of claim 19, wherein the at least one processor is configured to:

raise the power consumption of the local oscillator path in response to an increase of the power of the transmit signal; and lower the power consumption of the local oscillator path in response to a decrease of the power of the transmit signal.

21. The communication device of claim 20, wherein the at least one processor is configured to raise the power consumption so that relative phase noise of the processed local oscillator signal is decreased, and lower the power consumption so that the relative phase noise of the processed local oscillator signal is increased.

22. The communication device of claim 19, wherein the at least one processor is configured to:

raise a drive level provided to the local oscillator path in response to an increase of the power of the transmit signal; and lower the drive level of the local oscillator path in response to a decrease of the power of the transmit signal.

23. The communication device of claim 22, wherein the at least one processor is configured to raise the drive level so that relative phase noise of the processed local oscillator signal is decreased, and lower the drive level so that the relative phase noise of the processed local oscillator signal is increased.

* * * * *